US006294906B1

(12) United States Patent
Kuechler

(10) Patent No.: US 6,294,906 B1
(45) Date of Patent: Sep. 25, 2001

(54) CONTROL ELEMENTS FOR SWITCHING AND CONTROLLING ELECTRICAL APPLIANCES HAVING COVER PANELS

(75) Inventor: Wolfgang Kuechler, Ostheim (DE)

(73) Assignee: Preh-Werke GmbH & Co. KG, Bad Neustadt/Saale (DE)

( * ) Notice: Subject to any disclaimer, the term of this patent is extended or adjusted under 35 U.S.C. 154(b) by 0 days.

(21) Appl. No.: 09/547,077

(22) Filed: Apr. 11, 2000

(30) Foreign Application Priority Data

Apr. 16, 1999 (DE) .............................................. 199 17 191

(51) Int. Cl.[7] ............................... H05F 1/00; A47B 63/00
(52) U.S. Cl. ............................................. 323/371; 312/204
(58) Field of Search ..................................... 323/371, 282; 219/445.1, 506; 700/17, 83; 379/428; 312/204; 315/295; 5/606, 617, 610, 611

(56) References Cited

U.S. PATENT DOCUMENTS 4,296,334 * 10/1981 Wong ................................. 290/37 R
4,575,660 * 3/1986 Zaharchuk et al. .................. 315/295
4,660,126 * 4/1987 Koster et al. ......................... 361/728
5,053,758 * 10/1991 Cornett et al. ....................... 345/174
5,908,227 * 6/1999 Wilhemstatter et al. ............ 312/204

FOREIGN PATENT DOCUMENTS

4008827A1 9/1926 (DE) .
0841521A2 5/1998 (EP) .

* cited by examiner

*Primary Examiner*—Rajnikant B. Patel

(57) ABSTRACT

A control element for switching and controlling an electrical appliance having a cover panel includes a support (4) for receiving a top part, which can be attached and removed. The support can be glued onto the front panel (2), which need have no openings. Elements (14, 15, 16, 17) are in the top part for causing an indirect control transmission through the front panel, with sensors (5, 6, 7, 8, 9, 21, 22) behind the front panel (2) electrically sensing the indirect control transmissions and carrying out operational functions of the electrical appliance.

13 Claims, 6 Drawing Sheets

1
2
4
4.1
6
7
8
11
12
13
15

1
2
4
4.1
5
11
12
13
14
14.1
14.2

10
13
1
4
9.2
4.1
12
4
9.1
11
9
16
2

2
1
17
13
4
21
4.1
12
11
17
22

CONTROL ELEMENTS FOR SWITCHING AND CONTROLLING ELECTRICAL APPLIANCES HAVING COVER PANELS

BACKGROUND OF THE INVENTION

This invention relates to an control element for switching and controlling electrically operable appliances having cover panels.

Many electrical appliances, particularly home appliances, have cover panels made of glass, metal, plastic, etc., at which control elements are mounted. These cover panels are often structured as front panels. These front panels often have openings in them for accommodating the control elements. In addition to gaps that occur between the openings and the control elements, there are often gaps between the control elements and the front panel itself.

A disadvantage of this arrangement is that simple cleaning of the front panel or control panel is very difficult, and dirt often remains between the openings and the control elements in spite of the panel being cleaned. Additionally, machining of the front panel, i.e. creating the openings, is often very laborious and expensive.

German patent document (DE 40 08 827 A1) discloses a front panel or control panel of this type, having built-in control elements for home appliances. A disadvantage of this arrangement is that simple cleaning of the front panel or control panel is very difficult, and dirt often remains between the openings and the control elements despite the panel being cleaned. Additionally, machining of the front panel, i.e. creating the openings, is often very laborious and expensive.

European patent document (EP 0841 521 A2) discloses a front panel without openings that is easy to clean. However, this panel eliminates separate control elements. These controls are integrated into the front panel as actuating areas. Functions are actuated by pressing directly upon points on the front panel.

It is an object of this invention, therefore, to provide a control element that permits simple cleaning of the panel and that also makes machining of the pane unnecessary.

SUMMARY

According to principles of this invention, a control element includes a moveable upper part having a mount; a support for being adhered to a front side of a cover panel and for being selectively attached to the mount for allowing the upper part to be manipulated relative to the support and the front panel. According to the invention there is a transmitting element mounted on the upper part for moving with the upper part and thereby causing an indirect transmission through the front panel indicative of manipulation of the upper part. A sensor positioned behind the front panel senses the transmission indicative of manipulation of the upper part, even if the control panel has no opening therethrough, and controls the electrical appliance in response to manipulations of the upper part.

According to the invention the support for accommodating the upper part of the control element is glued onto the cover panel. Transmitting elements are placed on the upper part that effect an indirect control transmission through the front panel, and a sensor is positioned behind the panel to sense the transmission and perform an electrical evaluation of operational or actuating functions. Direct mechanical transmission elements that, as is generally known, require an opening through the panel are thus not needed. Undesirable gaps between the panel and transmission elements of the control element are thereby eliminated. The gaps between the panel and the control elements can be cleaned easily after the control elements are removed from the support, because these gaps then no longer exist.

Advantageous further developments are presented herein.

For example, the support can advantageously be of a resinous plastic having a pot-shaped center bearing for the control element. In another variant, the upper part of the control element can be supported on the outside of the upper part. Advantageously, the control element can be structured in different ways. The control elements, such as turning knobs, buttons, switches, etc., therefore, are structured in a modular manner and contain necessary snap attachments, mechanical stops, or electrical components that trigger control functions. Conventional panels such as front panels can be used.

However, complete rotary switches or buttons, as separate components independent of a front panel, can also be equipped with this indirect actuation.

These control elements can be utilized advantageously on home appliances such as stoves, dishwashers, washing machines, microwave ovens, etc. However, they may also be used on control consoles of facilities such as power plants, and on ships.

BRIEF DESCRIPTION OF THE DRAWING

The invention is described and explained in more detail below using embodiments shown in the drawings. The described and drawn features can be used individually or in preferred combinations in other embodiments of the invention. The foregoing and other objects, features and advantages of the invention will be apparent from the following more particular description of preferred embodiments of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
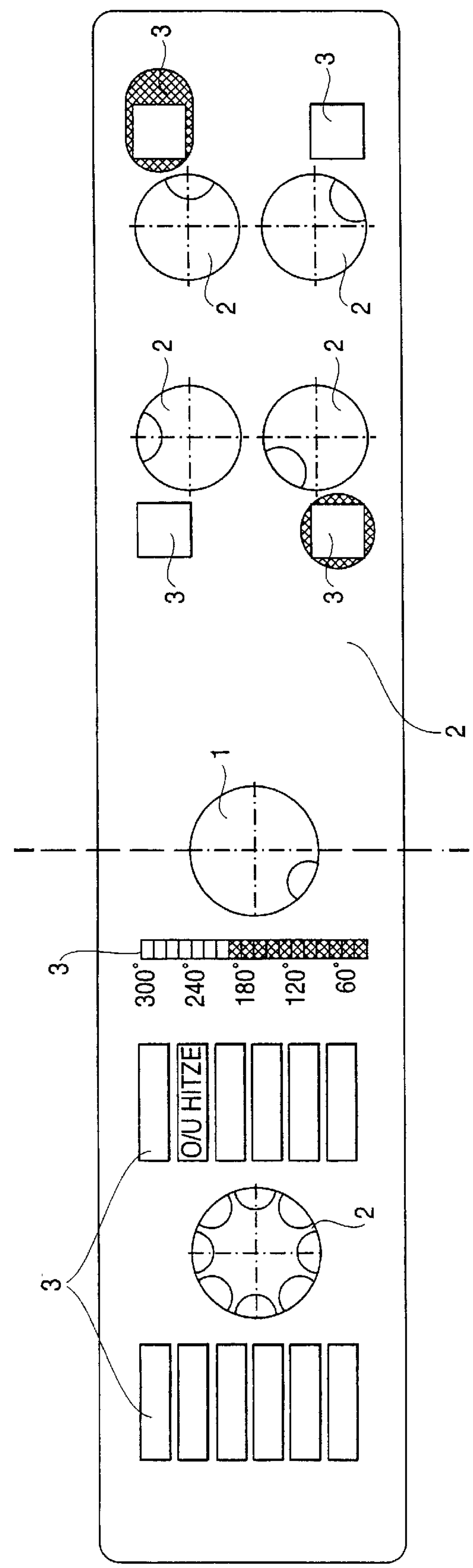
FIG. 1 is a plan view of a front panel of an electric appliance with control elements of this invention thereon.

FIG. 1 shows a plan view of control elements 1, a cover panel 2—preferably as a front panel of a not-further-shown electric appliance 1—, and applied printed foils 3. The front panel 2 may be made of conventional materials such as glass, plastic, or metal, or coatings thereof. The control elements 1 include, for example, rotary switches, switches, buttons, etc. The printed foils 3 serve, in a manner known in the art, for displaying function selections.

Figure 1A:
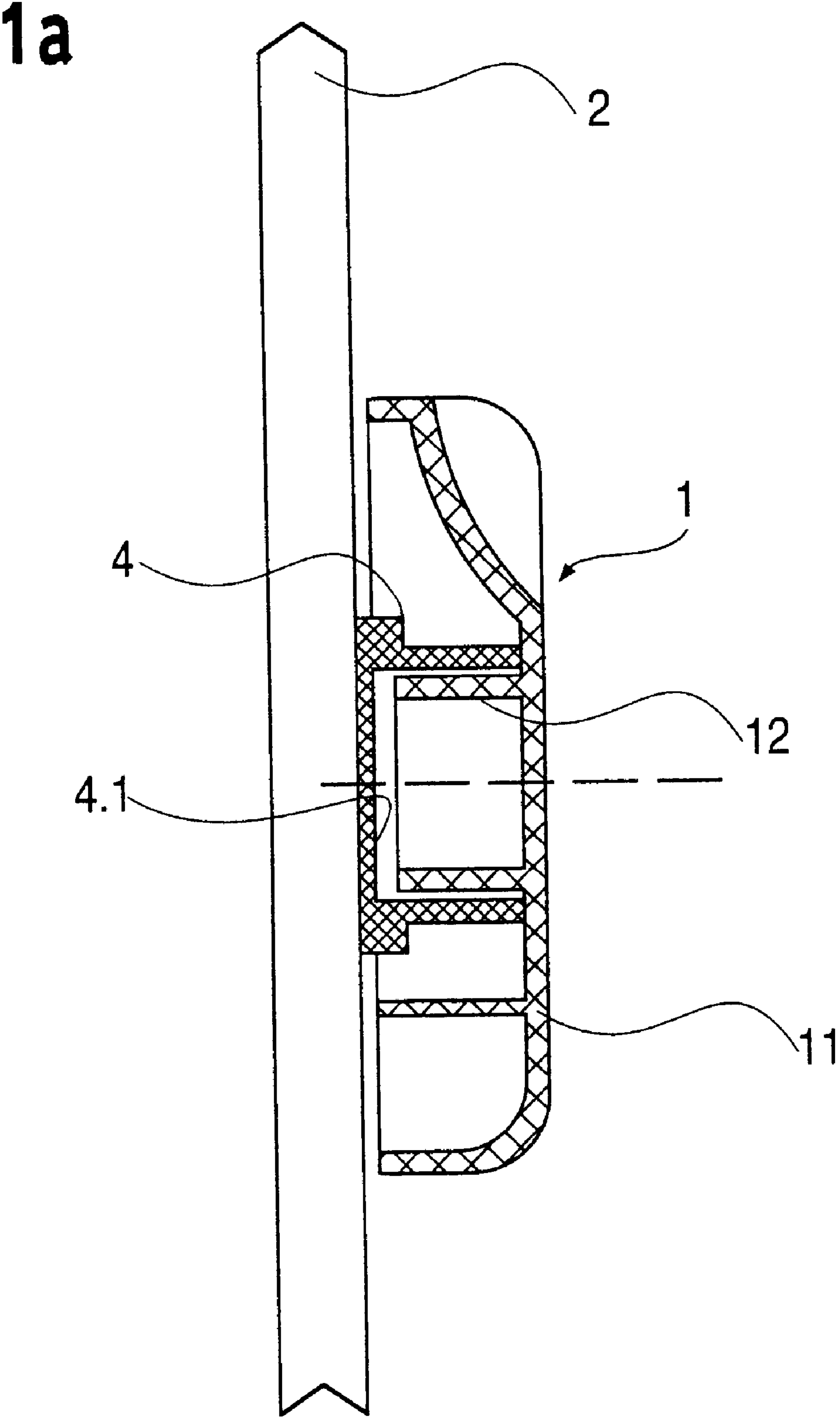
FIG. 1*a* is a segmented sectional view taken on line I—I of the front panel of FIG. 1 showing a support and upper part of a control element of the invention mounted on the front panel..

A general design of a portion of the control element 1 in cooperation with the front panel 2, which has no openings in this area, is shown in the section I—I of FIG. 1*a*. Several, preferably resinous plastic supports 4 are glued, or adhered, onto the front panel 2 for receiving attachable/detachable portions of control elements 1. A plastic support 4 includes a pot-shaped receiving part 4.1, whose bottom side is glued onto the front panel 2. The control element 1 has an upper part 11 that engages in the receiving part 4.1 of the plastic support 4 via a mount 12.

Figure 2:
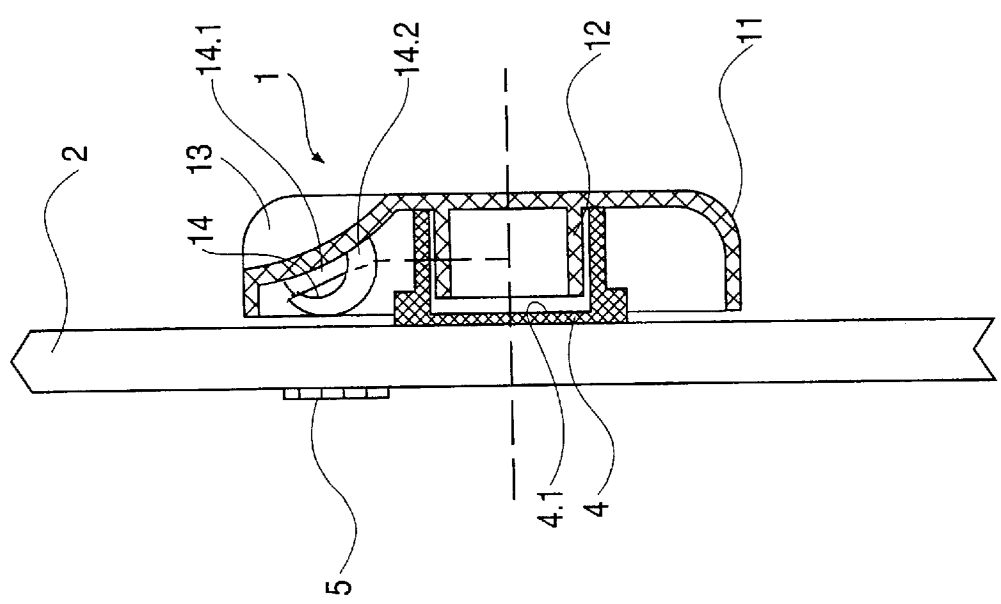
FIG. 2 is a sectional view taken on line I—I of FIG. 1 showing a first embodiment control element of the invention having a piezoelectric sensor.

FIG. 2 shows a first variant of the control element 1 as a piezoelectric-sensor-type control element. In addition to the individual parts shown and identified in FIG. 1*a,* the control element 1 preferably has, in its upper area 13, a type of hammer 14 having an actuating cam 14.1 and a pressure transducer 14.2. This hammer 14 strikes the front panel 2 when the control element 1 is manipulated. A piezoelectric sensor 5 located behind the front panel 2 generates a voltage impulse in response to the force impulse of the hammer 14 on the front panel 2, that is received by a following evaluation circuit, from which a function selection is defined in a known manner.

If the control element 1 includes a rotary switch, the rotational direction can be recognized in that an additional hammer (not shown) offset by 180° in the upper part strikes the front panel 2. Thus, for example, when the rotational direction is to the right, the hammer 14 strikes the front panel 2 before the second hammer and, when the rotational direction is to the left, the second hammer strikes before the hammer 14. The rotational speed is determined from an impulse separation between the two voltage impulses generated in this way, and the rotational direction from a phase position of these two voltage impulses with respect to each other. An adhesive used for adhering the plastic support 4 must, in this regard, on the one hand provide a certain strength (stability), but on the other hand it must not have any effect on bending of the piezoelectric sensor 5.

When rotary switches are used in the control element 1, it is advantageous to attach a plurality of piezoelectric sensors 5 in the rotation area behind :he front panel 2, so that correct determinations of the selected functions is improved. However, it is also possible to make do with only one piezoelectric sensor, with which, when the control element 1 is rotated, voltage impulses of different magnitudes are generated in the piezoelectric sensor 5 that have different voltage impulse values and define different functions.

When buttons are used as the control element 1, which are used mainly when an appliance is either switched on or switched off, a simple voltage impulse is sufficient for defining the selection function.

Figure 3:
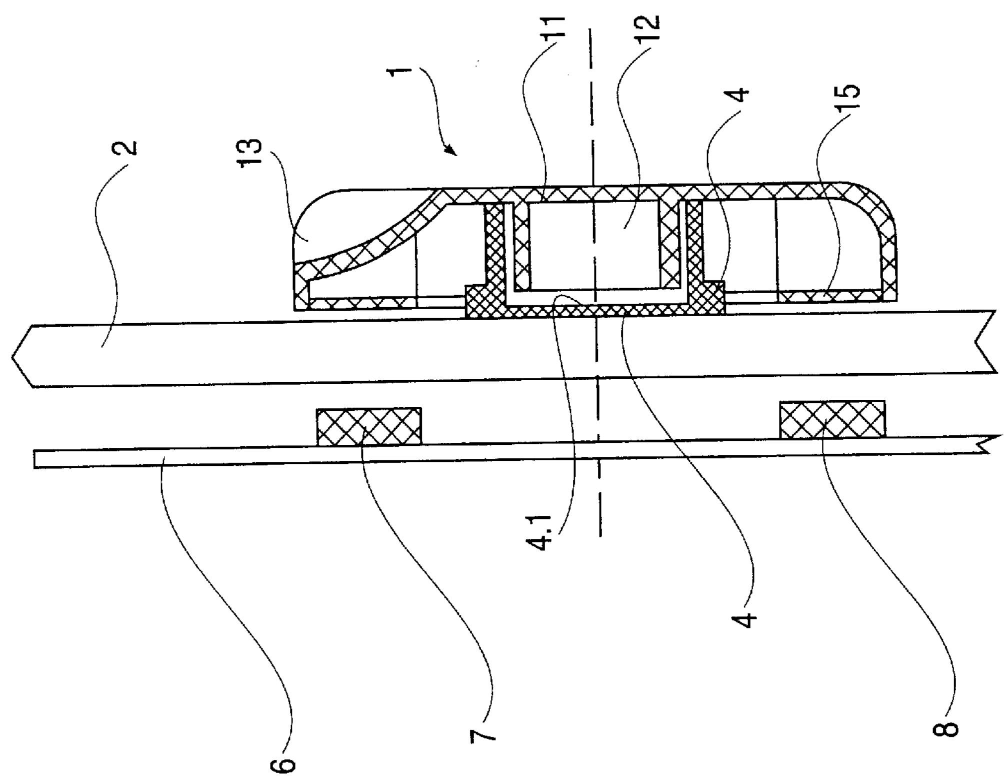
FIG. 3 is a sectional view taken on line I—I of FIG. 1 showing a second embodiment control element of the invention having an optoelectronic sensor.

FIG. 3 shows the control element 1 in the form of an optoelectronic control element. The control element 1, here including a rotary switch, has a band 15 which is imprinted on a side facing the front panel 2 with alternating black and white areas. An oploelectronic sensor 7, preferably a photodiode, is located behind the front panel 2 underneath the circular band 15. When the control element 1 is actuated, the optoelectronic sensor 7 senses color changes and generates corresponding readable electrical voltage signals.

By using a second optoelectronic sensor 8, in addition to rotational speed, a rotational direction of the control element 1 can also be determined, which is recognizable from two adjacent, concentric, printed circular bands 15. The optoelectronic sensors 7, 8 can also be structured as IR sensors, whereby printing on the control element 1 is omitted and, instead, beveled reflective surfaces are applied.

When a rotary button is used as the control element 1, the circular bands 15 are applied such that for each keying, the printed circular bands 15 are moved with respect to the optoelectronic sensors 7, 8.

Figure 4:
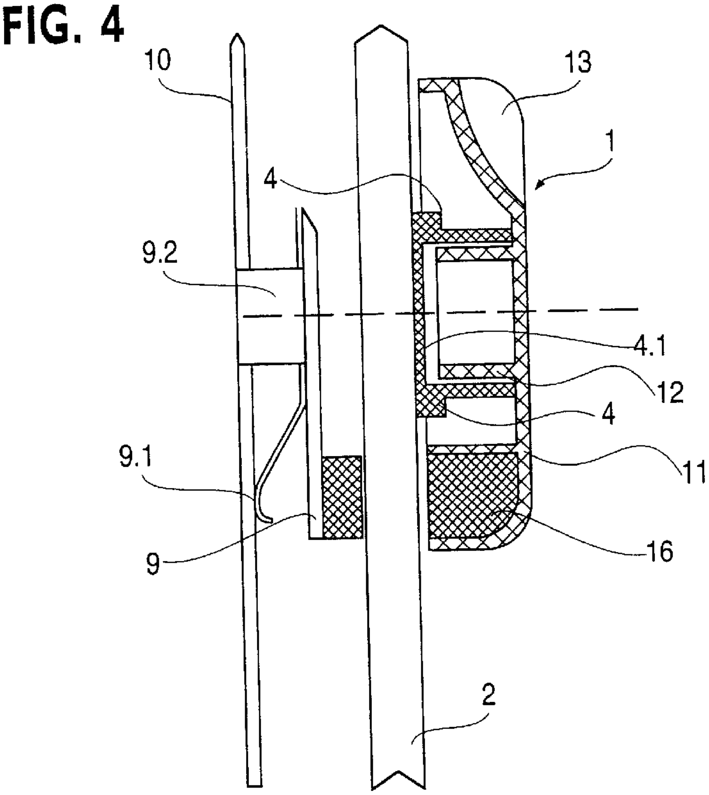
FIG. 4 is a sectional view taken on line I—I of FIG. 1 showing a third embodiment control element of the invention having a magnetic sensor.

FIG. 4 shows the control element 1 in the form of a magnetic control element. In this regard, a small magnet 16 or magnetized poled wheel (not shown) is mounted on the control element 1 below the upper part 11, facing the front panel 2. A magnet 9 magnetically coupled with the small magnet 16 is mounted behind the front panel as a shaftless potentiometer, for example, that moves a slider 9.1 on a printed circuit board 10 along with it. A potentiometer path (not shown in further detail) is printed on the printed-circuit board 10, along which the slider 9.1 is spring-biased slid. A spring support guide 9.2 is also integrated onto or into the printed-circuit board 10 and connected with the slider 9.1 and the magnet 9. When the control element 1 is manipulated as a rotary switch, the magnet 9 is moved relative to the printed-circuit board 10 by the small magnet 16. Different voltage signals similar to an output of a potentiometer are thereby generated. A rotational direction can be detected from an increase or decrease in these voltage signals with respect to each other, since, by moving the slider 9.1 on the potentiometer path, different resistances, and thus different voltage signals, are measured off.

Figure 5:
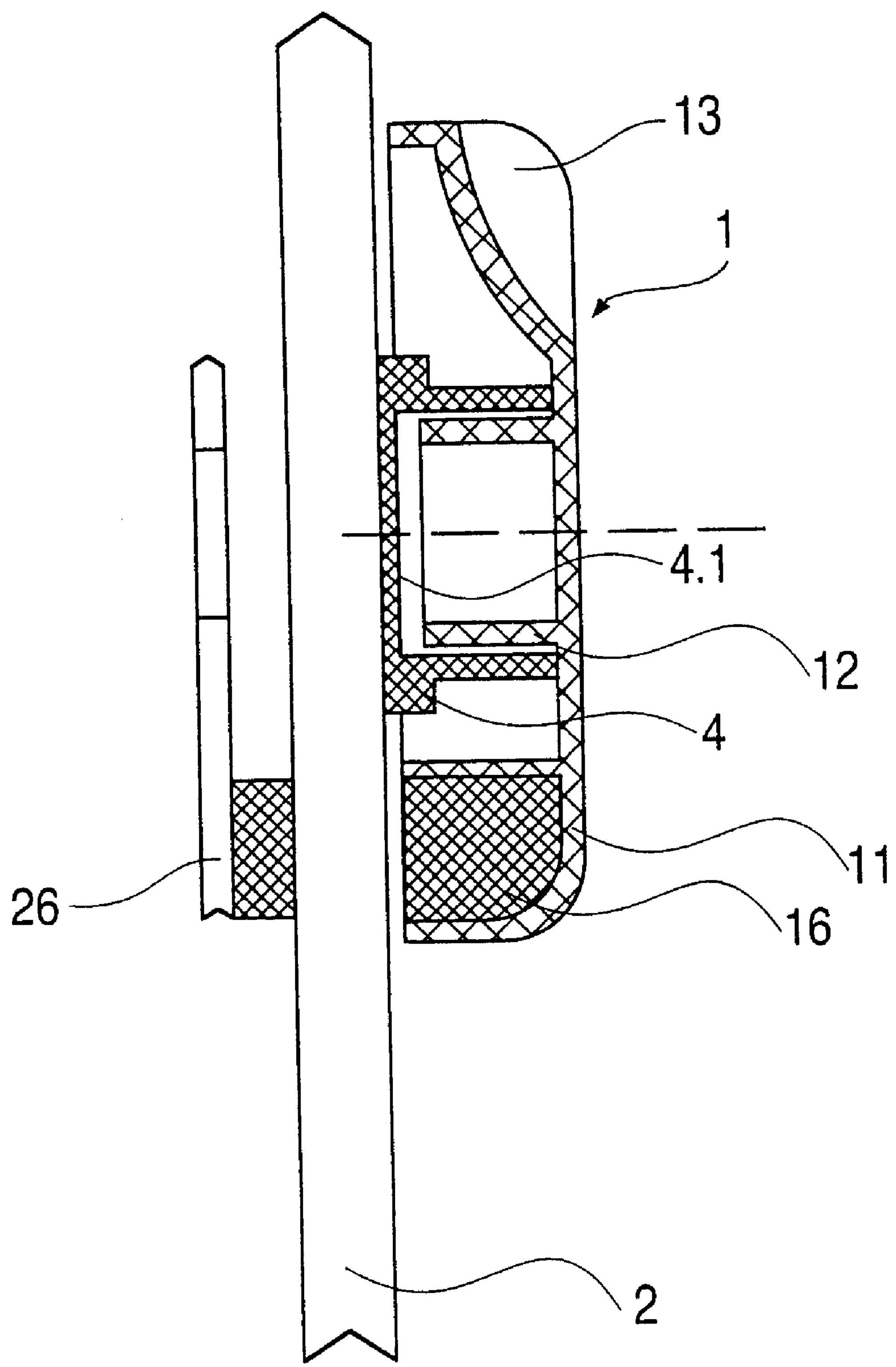
FIG. 5 is a sectional view taken on line I—I of FIG. 1 showing a fourth embodiment control element of the invention having a Hall effect sensor.

In FIG. 5 the control element 1 has a Hall effect sensor 26 under the front panel 2 from which, when the control element 1 is manipulated with the small magnet 16, an effective movement range of the small magnet 16 is derived. According to the Hall effect, depending on a position/distance of the small magnet 16 relative to the Hall sensor 26, various signals are generated at an output of the Hall sensor 26 that define desired function selections. Here also, two Hall effect sensors 26 are used if, in addition to rotational speed, rotational direction of the control element 1 is to also be detected. The signals generated by the Hall effect sensors 26 (as pairs) are then phase shifted with respect to each other, for example.

Figure 6:
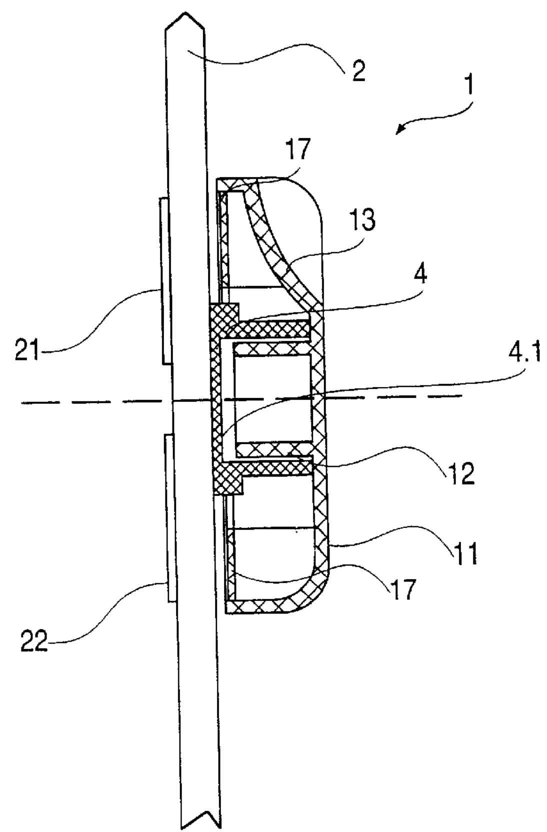
FIG. 6 is a sectional view taken on line I—I of FIG. 1 showing a fifth embodiment control element of the invention having a capacitive angle sensor.

Another variant of the control element 1 is shown in FIG. 6. Here, an electrically conductive path 17 is applied to a side of the upper part of the control element 1 facing the front panel 2. Behind the front panel 2, preferably two additional paths 21, 22, in the form of electrodes, are mounted directly on the front panel 2. The control element 1 then works, in a known manner, like a capacitive angle sensor by creating differing total capacitances from which rotational direction and rotational speed can be determined from varying voltage signals. Another possibility is to print the paths 21, 22 on an additional printed-circuit board (not shown) and to attach it behind the front panel 2.

Figure 7:
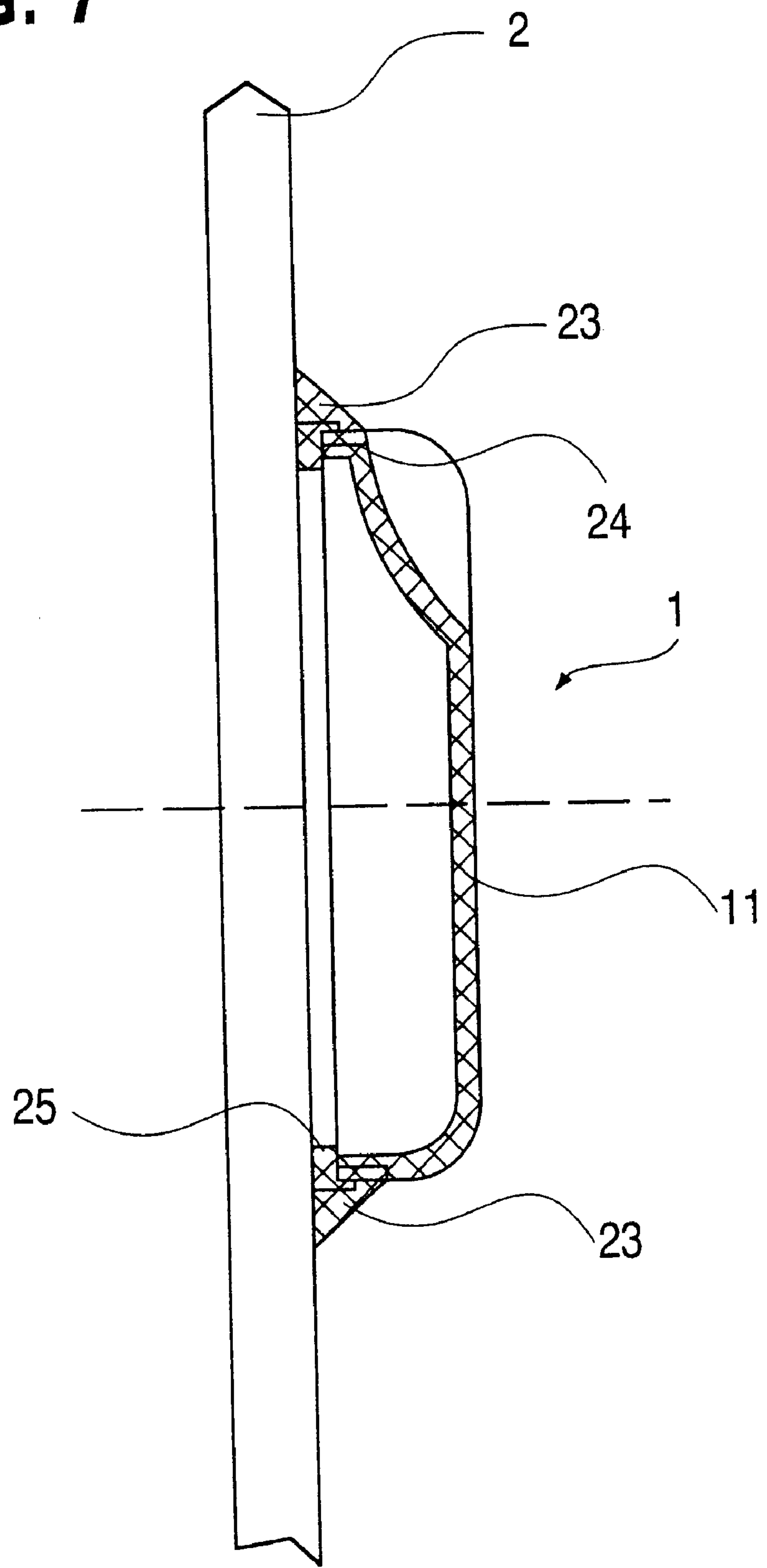
FIG. 7 is a sectional view taken on line I—I of FIG. 1 showing another embodiment of a support and upper part of a control element of the invention having an outside bearing arrangement mounted on the front panel.

In the embodiments described above, the upper part of the control elements 1 are placed and held at the center of the support 4. However, there is also the possibility of structuring a support 23 for accommodating the upper part of the control element 1 in such a way that the upper part of the control element 1 is supported from the outside (FIG. 7). In this instance, a mount 24, as an upperpart frame mount element, is located outside the upper part 11 of the control element 1. The mount 24 preferably has a rubber-like material so that when an additional spill protector 25 is placed around the support 23 and the mount 24, quiet turning is achieved. By means of the spill protector, contamination between the upper part 11 of the control element 11 and the front panel 2 is prevented.

As previously noted, the voltage signals generated by the various control elements 1 are conducted to an evaluation circuit, not shown but explained in further detail in European patent document (EP 0841 521 A2), for example, which is electrically connected with an additional display unit and/or with lamp elements (not shown) under the printed foil 3 as well as with a function-selection-and-control stage (not shown). Advantageously, the functioning of a control element 1, with respect to its dynamic values, end values, and its switching values (analog or digital signal processing), etc., can be programmed individually by a following program in the evaluation circuit, with the control element 1 being modular in construction. It can thus be established that, for example, an angular rotation of the control element 1 of 5° corresponds to a temperature increase of 10° C., and for another control element 1, corresponds to a temperature increase of only 5° C.

In order to ensure an accurate relative relationship of the elements 14, 15, 16, 17 on the control knob side with the elements 5, 6, 7, 8, 9, 21, 22 behind the panel 2 when the upper part of the control element 1 is re-applied, for example after cleaning, restricting guiding elements (not shown in detail) may be provided in the receiving part 4.1 of the support 4. In the same manner, the mount 12 would have a necessary counterpart (not shown in detail). The restricting guiding element in the receiving part 4.1 can be structured so that only when the control element 1 is in a predetermined position can it be removed. The upper part of the control element 1 can thus be prevented from being separated from the support 4 when in an operational position.

To prevent the upper part of the control element 1from possibly falling off the support 4, the mount 12, for example, has a conically extending taper with which the mount 12 is pressed into the receiving part 4.1. Because of the preferably rubber-like material of the mount 12, 24, the mount 12 is force fitted to the receiving part 4.1 or to the support 23 to a defined position, so that only by applying an intentional grasping force can the control element 1 be taken away or removed from the support 4, 23. However, a simple thread groove could also be provided on the receiving part 4.1, or on the support 23, and on the mount 12, 24.

Direct mechanical transmission elements are thus eliminated that, as is generally known, require an opening through the front panel 2. The undesirable gaps between a front panel and transmission elements of control elements are thereby eliminated. Gaps between the front panel and the control elements can be cleaned easily after the control elements are removed from the supports, because these gaps then no longer exist. These control elements 1 can be utilized advantageously on home appliances such as stoves, dishwashers, washing machines, microwave ovens, etc. However, they may also be used on control consoles of facilities such as power plants, and on ships.

The invention claimed is:

1. A control element for an electrical appliance of a type having a front panel, said control element comprising:

a rotatable upper part including a mount; a support for being adhered to a front side of the front panel and for being selectively attached to the mount for allowing the upper part to be rotatable relative to the support and the front panel; transmitting means mounted on the upper part for moving with the upper part and thereby causing an indirect transmission through the front panel indicative of rotation of the upper part without being linked to a structural member passing through an aperture in the front panel; a sensor positioned behind the front panel for sensing the indirect transmission indicative of rotation of the upper part and for controlling the electrical appliance in response to changes in position of the upper part, whereby the control element can be used on a front panel that has no openings therethrough.

2. The control element of claim 1, wherein the support is of a resinous plastic.

3. The control element of claim 1, wherein the mount is located near a middle area of the upper part.

4. The control element of claim 1, wherein the mount is at a periphery of the upper part and the support is outside of the upper part.

5. The control element as in claim 1, wherein the transmitting means is at least one hammer-like element and the sensor is at least one piezoelectric sensor which is closely coordinated to the hammer-like element behind the front panel.

6. The control element as in claim 1, wherein the transmitting means is a color-coded band that is arranged on a side of the upper part facing the front panel, with the sensor being at least one optoelectronic sensor mounted behind the front panel.

7. The control element as in claim 1, wherein the transmitting means is a magnetized element and the sensor includes a Hall effect sensor as part of a potentiometer located behind the front panel.

8. The control element as in claim 1, wherein the transmitting means includes a magnetized element and the sensor includes a magnetized element, a slider, and a potentiometer path printed on a circuit board to form a potentiometer located behind the front panel.

9. The control element of claim 1, wherein each of the transmitting means and the sensor is an electrically conductive path with the conductive paths of the transmitting means and the sensor forming a rotationally variable capacitor.

10. The control element of claim 1, wherein the front panel has no openings.

11. The control element of claim 1, wherein the front panel is made of at least one of a glass, plastic, glass coating and a plastic coating.

12. The control element of claim 1, wherein the front panel is made of metal.

13. A control apparatus including a front panel having a plurality of the control elements of claim 1 mounted thereon, wherein each control element is of modular construction with substantially the same structure as the other control elements and wherein the functions of the individual control elements are individually programmable.

* * * * *